United States Patent [19]
Blaschke

[11] 3,796,935
[45] Mar. 12, 1974

[54] APPARATUS FOR THE FIELD-RELATED REGULATION OF ASYNCHRONOUS MACHINES

[75] Inventor: Felix Blaschke, Erlangen, Germany

[73] Assignee: Siemens Aktiengesellschaft, Berlin & Munich, Germany

[22] Filed: Jan. 29, 1973

[21] Appl. No.: 327,869

Related U.S. Application Data
[63] Continuation of Ser. No. 226,141, Feb. 14, 1972, abandoned.

[30] Foreign Application Priority Data
Feb. 12, 1971    Germany............... P 21 06 789.0

[52] U.S. Cl................ 318/227, 318/230, 318/231
[51] Int. Cl. ............................................. H02p 5/40
[58] Field of Search................ 318/227, 230, 231

[56] References Cited
UNITED STATES PATENTS

| | | | |
|---|---|---|---|
| 3,500,158 | 3/1970 | Landau et al. | 318/227 |
| 3,512,067 | 5/1970 | Landau | 318/227 |
| 3,568,022 | 3/1971 | Domann et al. | 318/227 |
| 3,612,971 | 10/1971 | Blaschke et al. | 318/227 |
| 3,678,355 | 7/1972 | Bucek et al. | 318/227 |

Primary Examiner—Gene Z. Rubinson
Attorney, Agent, or Firm—Herbert L. Lerner

[57] ABSTRACT

An asynchronous machine is supplied with impressed stator current by an inverter in a field-related manner as disclosed in copending application Serial No. 63,073. A definite commutation sequence is achieved by utilizing a sine-cosine oscillator for cyclically driving the control paths of the inverter. The frequency of the oscillator is limited to values of one sign. An additional angle correction control eliminates the commutation error angle.

8 Claims, 7 Drawing Figures

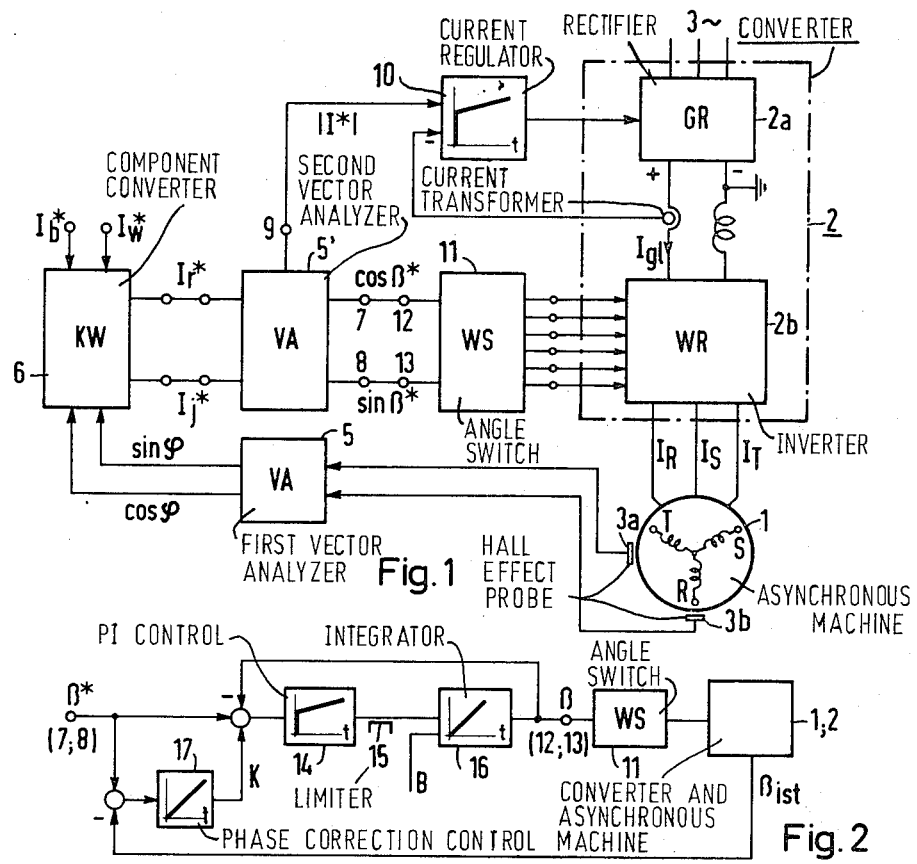
Fig. 1
Fig. 2
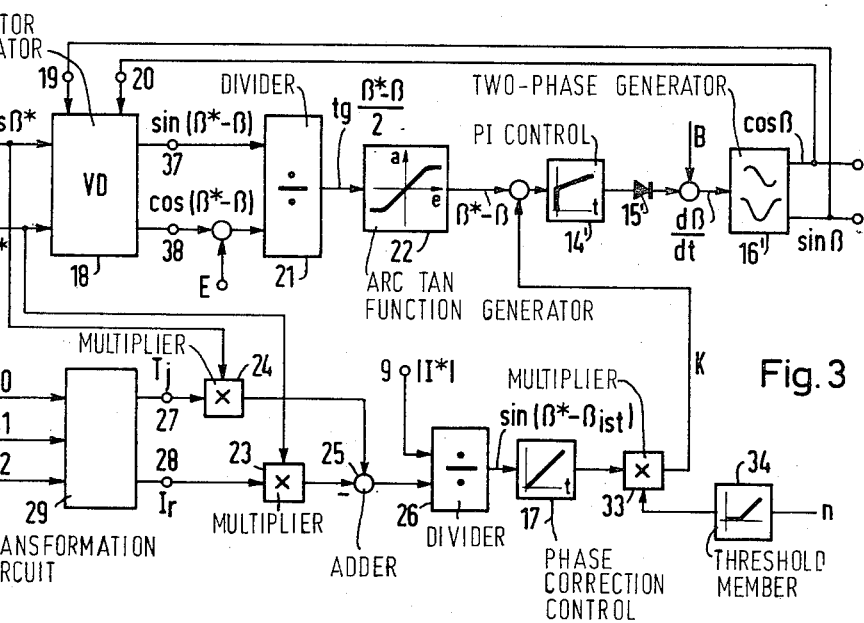
Fig. 3

3,796,935

APPARATUS FOR THE FIELD-RELATED REGULATION OF ASYNCHRONOUS MACHINES

This is a continuation, of application Ser. No. 226,141, filed Feb. 14, 1972, now abandoned.

DESCRIPTION OF THE INVENTION

The present invention relates to apparatus for the field-related regulation of asynchronous machines and is an improvement over the apparatus disclosed in copending application Ser. No. 63,073.

Copending application Serial No. 63,073 relates to apparatus for the field-related control or regulation of the stator current vector of an asynchronous machine which is supplied with an impressed intermediate circuit direct current by an inverter. An intermediate circuit current regulator drives the control paths of the converter. An angle switch driven by the components of a control vector is provided for the control paths of the inverter. The control vector, and thereby the stator current, is made a function of two input values. One of the input values influences only a component of the stator current vector parallel to the instantaneous rotary field axis. The other of the input values influences only a component perpendicular to the instantaneous rotary field axis.

In inverters of this type, it is necessary for operationally reliable commutation that the stator current vector or the control vector, respectively, always rotates in one and the same direction. A reversal of the direction of the preset control vector, even for a brief period, as may, for example, occur in the transition from generator to motor operation, should be avoided in order to assure proper commutation.

The object of the present invention is to provide apparatus for the field-related regulation of asynchronous machines which prevents a reversal of the direction of the preset control vector.

In accordance with the invention, the object of the invention is achieved by connecting in the input of the angle switch a two-phase generator whose frequency can be varied, starting from a minimum value, by the output signal of a PI control supplied with an input quantity depending on the difference between the phase angle of the control vector and the phase angle of the vector produced by the two-phase generator.

It is therefore the basic idea of the invention to have a vector quantity, determining the stator current vector, track the preset control vector. The tracking motion is always in the same direction of rotation, so that the cycle commutation in the individual phases of the machine, related to it, is also always in the same sequence.

Delays of the stator current vector caused by commutation may advantageously be avoided by providing that the output signal of a phase-correcting control for the angular position of the stator current vector is additionally supplied to the input of the PI control associated with the two-phase generator, preferably modulated by the speed of the machine.

In order that the invention may be readily carried into effect, it will now be described with reference to the accompanying drawings, wherein:

FIG. 1 is a block diagram of the apparatus of the above-mentioned copending application for the field-related regulation of asynchronous machines;

FIG. 2 is a block diagram of an embodiment of the apparatus of the invention, which is connected between the terminals 7 and 8 and 12 and 13 of FIG. 1;

FIG. 3 is a block diagram of the apparatus of FIG. 2 in greater detail than FIG. 3.

In the FIGS., the same components are identified by the same reference numerals.

Figure 4:
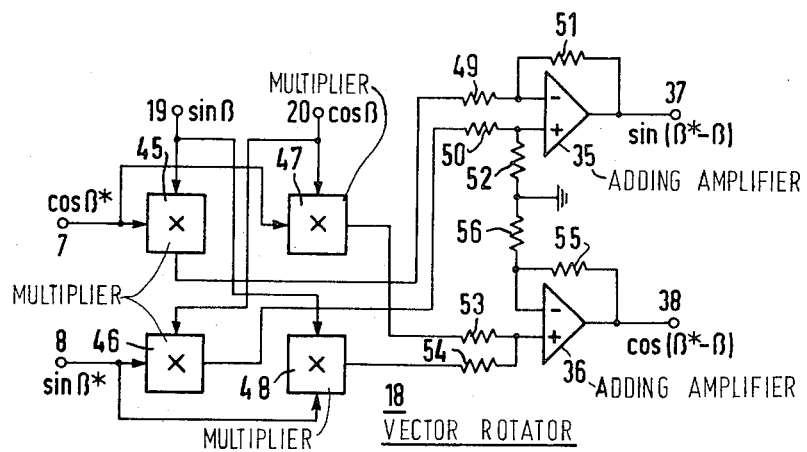
FIG. 4 is a block diagram of an embodiment of the vector rotator 18 of FIG. 3.

FIG. 1 shows the apparatus described in the copending application, which apparatus is improved by the present invention. An asynchronous machine 1 is supplied with impressed stator currents $I_R$, $I_S$ and $I_T$ from a three-phase system at its stator phase terminals R, S and T via an intermediate circuit converter 2 comprising a rectifier 2a and an inverter 2b. Two Hall effect probes 3a and 3b are electrically displaced 90° from each other at the periphery of the armature of the asynchronous machine. The Hall effect probes 3a and 3b provide images of the air gap field by producing two voltages, displaced in phase by 90°, which are fed to a first vector analyzer 5.

The first vector analyzer 5 forms from its input quantities a pair of normalized, stator-related components $\sin \phi$ and $\cos \phi$, which describe a unit vector rotating with the angular velocity of the air gap field. The components $\sin \phi$ and $\cos \phi$ are supllied to a component converter 6. The component converter 6 forms the corresponding statorrelated vector component datum values $I_r^*$ and $I_j^*$ from two field axis related perpendicular datum values $I_{w\ and\ Ib}^*$ for the stator current vector supplied to two inputs of said component converter. The components $I_r^*$ and $I_j^*$ of the stator current vector are supplied to a second vector analyzer 5'. The second vector analyzer 5' provides at its output terminals 7 and 8 corresponding normalized component voltages $\cos \beta^*$ and $\sin \beta^*$ of a control vector.

The second vector analyzer 5' produces at another output terminal 9 a quantity $|I^*|$ proportional to the magnitude of the stator current datum vector formed by the components $I_r^*$ and $I_j^*$. The quantity $|I^*|$ serves as the datum value for a current regulator 10 which forms a constant current $I_{ol}$ in the intermediate DC circuit. An angle switch 11 obtains from the component voltages $\sin \beta^*$ and $\cos \beta^*$ information regarding six discrete angle positions per revolution of the control vector. The information is transformed into corresponding control commands for the firing of the valves of the inverter 2b.

Firing pulses are produced at the output terminals of the angle switch 11. The firing pulses control the valves of the inverter 2b in such a manner that the stator current vector always follows six discrete angular positions of the control vector described by the component voltages $\cos \beta^*$ and $\sin \beta^*$. The control vector, and with it, the stator current vector is thereby preset as to magnitude and phase. The change of the stator current vector itself is in predetermined directions parallel and perpendicular to the instantaneous rotary field axis.

FIG. 2 is a schematic block diagram illustrating the basic manner of operation of the supplementary apparatus of the invention which is connected in the apparatus of FIG. 1 between the terminals 7 and 8 and 12 and 13. It is assumed that the control vector is described by a quantity $\beta^*$ corresponding to its angle coordinate. The quantity $\beta^*$ is supplied to the input circuit of a PI control 14. The output quantity of the PI control 14, limited to positive values by means of a limiter 15, is supplied to an integrator 16 whose output quantity $\beta$ is fed back to the input of the PI control 14 and which will therefore change in the direction of approaching the quantity or magnitude $\beta^*$.

A constant positive supplemental input B to the integrator 16 compensates for the fact that a small change of the output signal $\beta$ always occurs in a defined direction, so that the angle $\beta$ is also made to agree with the desired angle $\beta^*$ for those cases in which the output signal of the PI control 14 tends to assume negative values because of a definite polarity of its input signal. That is, it is at the limit formed by the limiter 15. The angle quantity $\beta$ will therefore always change only in one direction, so that trouble-free commutation of the inverter, controlled by the angle switch 11, is thereby assured.

A phase correction control 17 is associated with the stator current vector control. The phase correction control 17 is an angle correction control. The phase correction control 17 forms a correction signal K from a comparison between the angular position $\beta^*$ of the present control vector and the actually occurring stator current vector $\beta_{ist}$. The correction signal K is also supplied to the input of the PI control 14. The stator current vector is thereby made to follow the value of the preset control vector very rapidly and accurately.

FIG. 3 shows the apparatus of FIG. 2 in greater detail. The perpendicular component voltages $\cos \beta^*$ and $\sin \beta^*$ of the control vector, provided at the terminals 7 and 8, are supplied to a vector rotator 18. Two component voltages $\cos \beta$ and $\sin \beta$ of a rotating vector produced by a two-phase generator 16' are applied to input terminals 19 and 20 of the vector rotator 18. The vector rotator 18 produces quantities which correspond to the cos and the sin of the difference angle $\beta^*-\beta$ of the vectors supplied to it.

The design of the two-phase generator 16' is known per se. It essentially comprises two integrators connected in tandem, each of which is preceded by a multiplier. The output signal of the second integrator is fed back to the input of the first integrator. If an input voltage is applied to such a static two-phase generator, a sin-cos pair appears at its two outputs, which always indicates the time integral of the input quantity. From the timing point of view, the two-phase generator 16' therefore corresponds to the integrator 16 of FIG. 2.

The output voltage $\sin(\beta^*-\beta)$ of the vector rotator 18 is applied directly to the dividend input of a divider 21. The output voltage $\cos(\beta^*-\beta)$ of the vector rotator 18, augmented by a constant unit voltage E of magnitude 1, is applied to the divisor input of the divider 21. The divider 21 therefore produces an output voltage which is proportional to the tangent of one half the difference angle between the control vector and the vector produced by the two-phase generator 16' in accordance with the equation $\sin \alpha/1 + \cos \alpha = \tan (\alpha/2)$ An arc tan function generator 22, between the input quantity $e$ and output quantity $a$ of which the relation $a = 2$ arc tan $e$, produces a quantity which is directly proportional to the angle difference $\beta^*-\beta$. The angle difference $\beta^*-\beta$ is supplied to the input of a PI control 14'. The PI control 14' produces an output quantity which changes the frequency of the two-phase generator 16' and thereby the phase of the vector produced by it in the sense that the input voltage of said PI control becomes zero. The angle position of the vector produced by the two-phase generator 16' is therefore made to track the angle position of the control vector.

A diode 15', comparable to the limiter 15 of FIG. 2, assures that only positive values of the output voltage of the PI control 14' become effective and that, as a result, the vector described by the component voltages $\cos \beta$ and $\sin \beta$ may always rotate only in one direction. The constant positive supplementary input B attains in this connection a minimum frequency for the case that in the event of negative output signals of the PI control 14', the diode 15' cuts off.

The aforedescribed manner of setting the vector supplied to the angle which is a pure control and in principle cannot therefore guarantee that the stator current vector will exactly track the present control vector. At higher frequencies particularly, there is basically a danger with this type of control that delays caused by the commutation, considered as dead time in control engineering, lead to the condition that the stator current vector lags the control vector in a no longer justifiable manner and thereby reduces the advantages obtainable with the field-related setting of the stator current vector.

In order to compensate for the aforedescribed and other interference effects, the phase correction control 17 (FIGS. 2 and 3) is provided. The input quantity of the phase correction control 17 is the sine of the difference angle between the control vector and the stator vector. This input quantity is produced by two multipliers 23 and 24, an adder 25, and a divider 26. Inputs of the multipliers 23 and 24 are connected to the terminals 7 and 8 and other inputs of said multipliers are connected to output terminals 27 and 28 of a transformation circuit 29.

The transformation circuit 29 produces from three input voltages applied to input terminals 30, 31 and 32, proportional to the phase current $I_R$, $I_S$ and $I_T$ of the asynchronous machine 1, two corresponding perpendicular component voltages of the stator voltage vector, which has the phase angle $\beta_{ist}$ in a cartesian coordinate system. An adder 25 subtracts the output voltage of the multiplier 23 from the output voltage of the multiplier 24. The difference produced by the adder 25 is divided in the divider 26 by the magnitude of the stator current vector $|I^*|$, which is supplied via the terminal 9 of the second vector analyzer 5'.

The input signal of the phase correction control 17 is thus proportional to the sine of the angle difference between the control vector and the stator current vector. The output quantity of the phase correction control 17 then provides a correction effect K until the input quantity of said phase correction control becomes zero, that is, until there is actual agreement between the preset control vector and the sector current vector.

Since the influence of the dead time due to the commutation becomes more noticeable as an interference factor, as the speed of the machine increases, it has been found advisable to modulate the output signal of the correction control by means of a multiplier 33 as a function of a quantity depending upon the machine speed $n$ in such a manner that the correction control output signal increases with increasing machine speed. The speed with which the phase correction control is able to compensate for an angle deviation may thereby be adapted to the actual requirements.

Since the control vector rotates continuously and there is a corresponding stepwise advance motion of the stator current vector, caused by the stepwise operation of the angle switch 11, a considerable instability of the output signal of the phase correction control 17 would have to be tolerated in the range of very low speeds. For this reason, the speed regulating influence of the quantity depending upon the machine speed $n$ on the multiplier 33 is supplied to said multiplier via a threshold member 34. The output signal of the threshold member 34 is zero in the range of low speeds and thereby suppresses the correction effect K. The threshold member 34 may comprise, for example, a biased diode or, as in FIG. 3, an amplifier having a preset response threshhold.

FIG. 4 shows an embodiment of the vector rotator 18 of FIG. 3. The vector rotator 18 corresponds in principle with the component converter 6 of FIG. 1. The vector rotator 18 of FIG. 4 comprises two adding amplifiers 35 and 36 and four multipliers 45, 46, 47 and 48. The output voltages of the multipliers 45 and 46 are applied to the inputs of the adding amplifier 35 and the output voltages of the multipliers 47 and 48 are applied to the inputs of the adding amplifier 36. Resistors 49, 50, 51, 52, 53, 54, 55 and 56 are connected to the inputs of the amplifiers 35 and 36, respectively. The resistors connected to the same polarity input terminals of the amplifiers 35 and 36 have the same resistance value.

The input terminal 7 is connected to an input of each of the multipliers 45 and 47. The input terminal 8 is connected to an input of each of the multipliers 46 and 48. The input terminal 19 is connected to another input of each of the multipliers 45 and 48. The input terminal 20 is connected to another input of each of the multipliers 46 and 47. If the component voltages of the control vector $\cos \beta^*$ and $\sin \beta^*$ are applied to the input terminals 7 and 8, and the component voltages $\sin \beta$ and $\cos \beta$ of the vector produced by the two-phase generator 16′ are applied to the input terminals 19 and 20, voltages appear at output terminals 37 and 38. The voltages at the output terminals 37 and 38 are proportional to the sin and the cos of the difference angle $\beta^*-\beta$.

Figure 5:
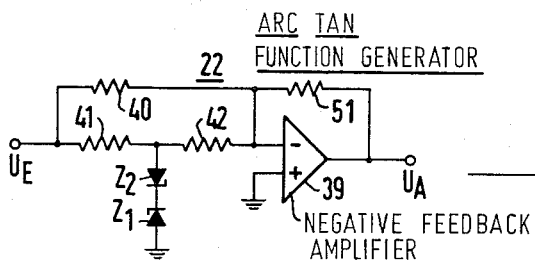
FIG. 5 is a block diagram of an embodiment of the arc tan function generator 22 of FIG. 3.

FIG. 5 illustrates an embodiment of the arc tan function generator 22 of FIG. 3. The arc tan function generator 22 of FIG. 5 comprises an amplifier 39 having negative feedback via a resistor 57, a resistor 40 having a high resistance value and two resistors 41 and 42 connected in series circuit arrangement and having relatively low resistance values. The series circuit arrangement 41 and 42 is connected in shunt with the resistor 40. The resistors 40, 41 and 42 are connected to the input of the amplifier 39. A common point in the connection between the resistors 41 and 42 is connected to a point at ground or reference potential of the amplifier 39 via a pair of Zener diodes $Z_1$ and $Z_2$ connected in series circuit arrangement with each other. The Zener diodes $Z_1$ and $Z_2$ have the same breakdown voltage and are connected to each other in opposite polarities.

Figure 6:
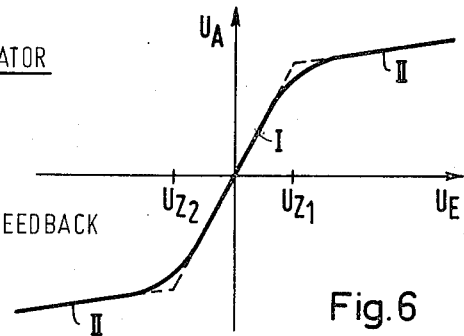
FIG. 6 is a graphical presentation illustrating the operation of the arc tan function generator 22.

FIG. 6 shows the characteristic illustrating the operation of the arc tan function generator 22. In FIG. 6, the abscissa represents the input voltage $U_E$ and the ordinate represents the output voltage $U_A$. If the magnitude of the input voltage $U_E$ has not yet reached the value of the breakdown voltages $U_{Z_1}$ or $U_{Z_2}$, respectively, of the Zener diodes $Z_1$ or $Z_2$, respectively, one of said Zener diodes is cut off and the input impedance of the amplifier 39 is essentially determined by the low resistance values of the resistors 41 and 42. A relatively large gain corresponding to the branch I of the curve is therefore obtained.

If the magnitude of the input voltage $U_E$ exceeds the values of the breakdown voltages $U_{Z_1}$ or $U_{Z_2}$, both Zener diodes $Z_1$ and $Z_2$ conduct. A constant voltage is applied via the resistor 42. The constant voltage is determined by the breakdown voltage of the Zener diodes. The voltage $U_E$ is applied to the input of the amplifier 39 via the resistor 40. The overall gain of the entire circuit of FIG. 5 is therefore reduced, starting with the voltage value $U_{Z_1}$ or $U_{Z_2}$, respectively, of the input voltage $U_E$, and a curve corresponding to the branches II of the curve of FIG. 6 results.

The desired arc tan function may therefore be simulated in sufficient approximation by suitable selection of the Zener diodes and the resistors. An additional favorable factor is that the set-in of the Zener breakdown voltage does not occur suddenly with suitably selected components, so that actually a gradual transition from the branch I to the branches II of the curve of FIG. 6 results.

Figure 7:
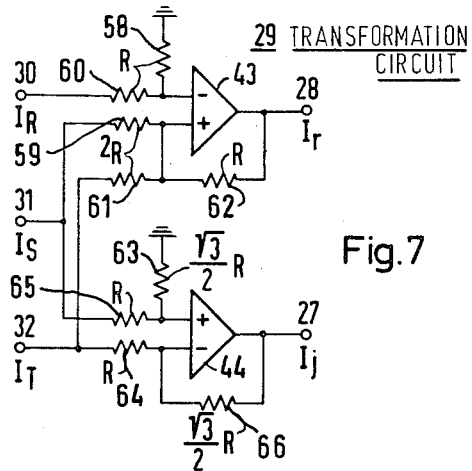
FIG. 7 is a block diagram of an embodiment of the transformation circuit 29 of FIG. 3.

FIG. 7 shows an embodiment of the transformation circuit 29 of FIG. 3 for transforming the phase values $I_R$, $I_S$ and $I_T$ of the stator current into the corresponding perpendicular stator current components $I_r$ and $I_j$. Three voltages are applied to three input terminals 30, 31 and 32. The three voltages are provided by current transformers connected in the stator leads and are therefore proportional to the phase currents. The input terminals 30, 31 and 32 are connected to two amplifiers 43 and 44 via resistors 58, 59, 60, 61, 62, 63, 64, 65 and 66 which have the resistance value ratios indicated in FIG. 7.

The resistors 48 to 66 are so connected that the voltages at the output terminals 27 and 28 satisfy the equations $$I_r = I_R - \tfrac{1}{2}(I_S + I_T)$$

and $$I_j = (\sqrt{3/2})I_S - (\sqrt{3/2})I_T$$

The stator current component $I_r$ in this case would be associated with the same direction as that associated with the phase component $I_R$.

The circuitry utilized in each of the blocks of the drawings is well known in the art. Each of these blocks constitutes an analog computer building block, which is known in the art and which is commercially available. Thus, for example, each of the multipliers 23, 24, 33, 45, 46, 47 and 48 is the multiplier described on page 55, section II.32, of the "Application Manual for Computing Amplifiers for Modelling Measuring Manipulating & Much Else" by Philbrick Researches, Inc., 1966. The multiplier is also shown on pages 92 and 93 of Analogrechnen, or Analog Computation, by Giloi and Lauber, Springer-Verlag 1963. The multiplier is available as building block Q3M1P, manufactured by Philbrick/Nexus Research of Dedham, Mass.

Each of the dividers 21 and 26 is described on page 55, section II.33 of the aforedescribed "Application Manual for Computing Amplifiers for Modelling Measuring Manipulating & Much ". The divider is available as building block Q3M1P.

The inverter shown in block 2 is specifically disclosed in FIGS. 13 and 14 of application Ser. No. 63,073, filed Aug. 12, 1970, and in "Controlled Rectifier Manual", First Edition, 1960, pages 104 and 105, FIGS. 7.18 and 7.19B. The proportional components and summation units $4a$ and $4b$ are disclosed in FIG. 3 of said application. The vector analyzers 5 and 5' are disclosed in FIG. 5 of said application. The component converter 6 is disclosed in FIG. 6 of said application. The regulator 10 is disclosed in "Siemens Zeitschrift", 1965, pages 862 to 864, particularly page 863. The transformation circuit 29 is disclosed in FIGS. 7 and 8 of said application. The angle switch 11 is disclosed in FIG. 15 of said application. The phase correction control 17 is disclosed in FIG. 17 of said application. The integrator 16 is disclosed in the publication "Elektronik", 1966, No. 7, work sheet No. 6, Position 14 and in "Application Manual for Computing Amplifiers . . . "page 44, Section II. 10.

While the invention has been described by means of a specific example and in a specific embodiment, it should not be limited thereto, for obvious modifications will occur to those skilled in the art without departing from the spirit and scope of the invention.

I claim:

1. Apparatus for the field-related regulation of the stator current vector of an asynchronous machine supplied with an impressed intermediate circuit direct current by an inverter having control paths, said apparatus having a converter control paths, an intermediate circuit current regulator connected to the control paths of the converter, and an angle switch connected to the control paths of the inverter, said apparatus comprising control current means for providing a control current having components and supplying the components of the control current to the angle switch, said control current means comprising a two-phase generator having an output connected to the angle switch and an input, said two-phase generator producing a vector having a phase angle $(\beta)$, a PI control having an output coupled to the input of the two-phase generator for producing an output signal for varying the frequency of the two-phase generator from a minimum, said PI control having an input, and means connected to the input of the PI control for supplying to said PI control a quantity dependent upon the difference angle between the phase angle $(\beta^*)$ of a control vector and the phase angle of the vector produced by the two-phase generator.

2. Apparatus as claimed in claim 1, wherein the control current means further comprises limiting means connected between the PI control and the two-phase generator for unilaterally limiting the output signal of the PI control, and input means connected to the input of the two-phase generator for applying a constant bias input to the two-phase generator.

3. Apparatus as claimed in claim 1, wherein the apparatus comprises control vector means for providing the control vector and control vector component voltages and the control current means further comprises a vector rotator having inputs connected to the control vector means and to the output of the two-phase generator and outputs for producing quantities proportional to the sin and cos of the difference angle $(\beta^*-\beta)$, a divider having inputs connected to the outputs of the vector rotator and an output, and an arc tan function generator having an input connected to the output of the divider and an output connected to the input of the PI control, the quantities produced by the vector rotator being supplied to the divider to produce a quantity proportional to the tangent of one half the difference angle and a constant voltage (E).

4. Apparatus as claimed in claim 1, wherein the apparatus further comprises speed means having an output for producing a signal indicating the speed of the machine and the control current means further comprises a phase correction control having an input coupled to the machine and an output for producing an output signal indicating the angle position of the stator current vector, and multiplying means having an input connected to the output of the phase correction control, an input coupled to the output of the speed means and an output connected to the input of the PI control for supplying to the PI control the output signal of the phase correction control modulated by the signal indicating the speed of the machine.

5. Apparatus as claimed in claim 3, wherein the vector rotator of the current control means comprises two adding amplifiers each having inputs and an output, four multipliers each having inputs and an output connected to a corresponding input of a corresponding one of the adding amplifiers, and input means for connecting the inputs of the multipliers to the output of the control vector means and to the output of the two-phase generator to supply the control vector component voltages and the output voltages of the two-phase generator to said multipliers.

6. Apparatus as claimed in claim 3, wherein the arc tan function generator of the current control means comprises a negative feedback amplifier having inputs, a pair of resistors having a specific resistance value connected in series circuit arrangement to an input of the amplifier, a third resistor having a higher resistance value than that of the pair of resistors connected in parallel with the series circuit arrangement, and a pair of Zener diodes connected in series circuit arrangement with opposite polarities between a common point in the connection between the pair of resistors and a point at the reference potential of the amplifier, the other input of the amplifier being connected to the point at the reference potential of the amplifier.

7. Apparatus as claimed in claim 4, wherein the control current means further comprises a threshhold element connected between the output of the speed means and the corresponding input of the multiplying means for suppressing the output signal of the phase correction control at low machine speeds.

8. Apparatus as claimed in claim 4, wherein the control current means further comprises a pair of multipliers each having an input connected to a corresponding input of the vector rotator, an input coupled to the machine and an output, an adder having a pair of inputs each connected to the output of a corresponding one of the multipliers and an output, and a divider having an input connected to the output of the adder and an output connected to the phase correction control, said multipliers, adder and divider producing a quantity proportional to the sin of the difference angle $(\beta^*-6-2_{ist})$ between the stator current vector and the control vector.

* * * * *